Nov. 19, 1957 R. E. GILL 2,813,671
FLARE HOLDER
Filed Dec. 31, 1954
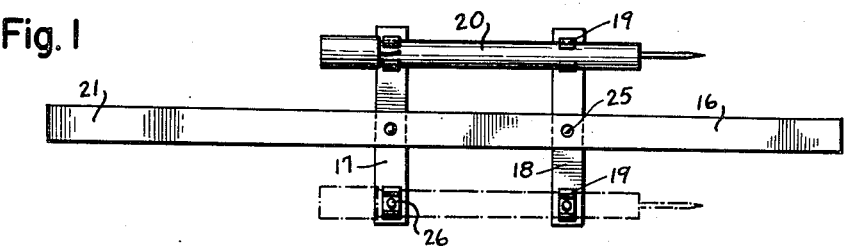
Fig. 1
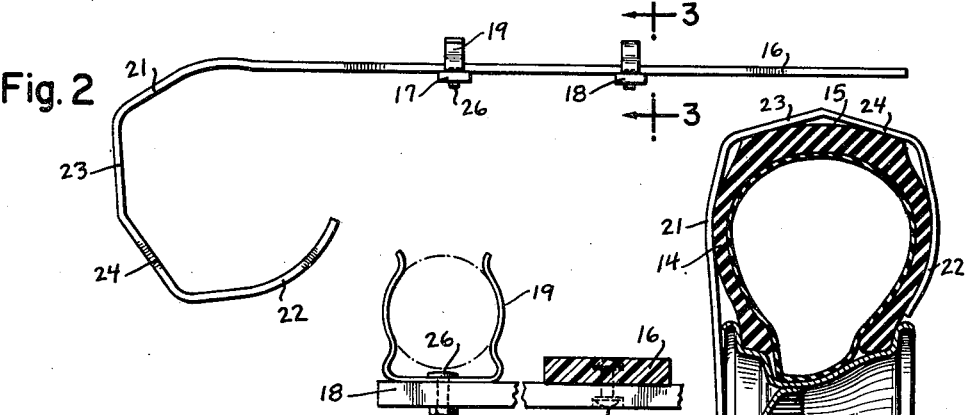
Fig. 2
Fig. 3
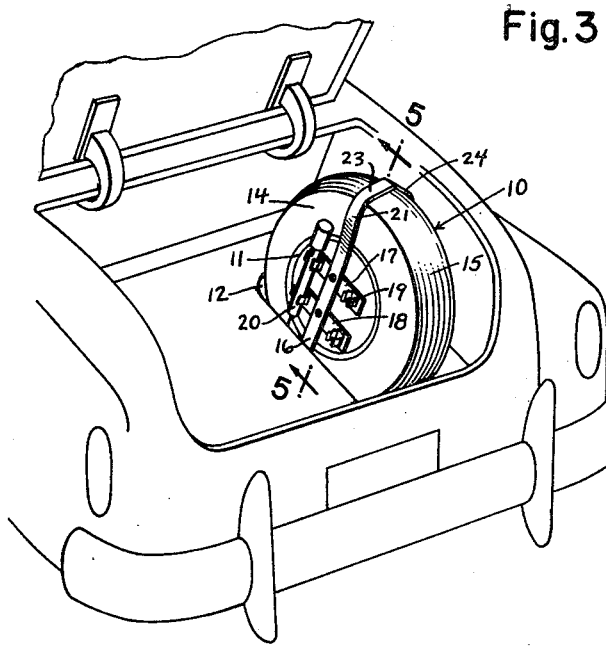
Fig. 4
Fig. 5
INVENTOR.
Robert E. Gill
BY Barnes, Seed, & Secrest
attys.

United States Patent Office 2,813,671
Patented Nov. 19, 1957

2,813,671

FLARE HOLDER

Robert E. Gill, Mercer Island, Wash.

Application December 31, 1954, Serial No. 479,158

1 Claim. (Cl. 224—42.45)

The present invention relates to a holder for the storage of road warning flares in automobiles.

In a case of motoring emergency such as a blowout, collision, motor failure, etc., the motorist is frequently unable to get his automobile completely off of the highway and out of the normal traffic path. Such a situation is, of course, fraught with danger because an oncoming driver normally would not be expecting a stopped vehicle and might not have sufficient braking distance after becoming aware of the situation. The danger is even more magnified at night and particularly when the disabled auto is without lights as is often the case.

To serve as warning signals for such emergencies various flares have been produced in a cartridge form which can be readily ignited and will burn with a red flame for an extended period of time. These flare cartridges normally have a ground spike projecting from their lower end which can be forced into the ground at the edge of the road to hold the flare upright. The logical storage place for such flares in conventional automobiles is most usually the trunk, but care must be had that the flares remain readily accessible when the trunk contains baggage as well as being reasonably protected from damage. Also the flares should be so positioned during storage that their ground spikes are not an undue hazard.

Accordingly, the present invention aims to provide a simple and safe manner of trunk storage for flare cartridges which will give ready access thereto and at the same time minimize the likelihood of their being damaged. In carrying out this basic object the invention contemplates the use of the spare tire, normally stored in the trunk of conventional automobiles, as a support for a detachable holder, and it is thus a further and particular object to provide, as a mounting for flare cartridges, such a holder as will inherently tend to induce the driver of an automobile to use the same, when changing the tire, in that the flare cartridges must be removed from the spare tire before the spare tire can be used.

With yet additional objects and advantages in view which, with the foregoing, will appear and be understood in the course of the following description and claim, the invention consists in the novel construction and in the adaptation and combination of parts hereinafter described and claimed.

In the accompanying drawings:

Figure 1 is a plan view of my flare holder with one flare gripped thereby and a second flare shown in broken lines.

Fig. 2 is a side view of the flare holder.

Fig. 3 is a fragmentary sectional view to an enlarged scale taken on line 3—3 of Fig. 2.

Fig. 4 is a perspective view illustrating the flare holder in operative position; and Fig. 5 is a vertical sectional view taken on line 5—5 of Fig. 4 to the approximate scale of Fig. 1.

Referring to Fig. 4 of the drawings it is seen that I have illustrated the general layout of the trunk compartment of a conventional automobile, and namely, one in which the spare tire 10 and its related rim 11 are seated in upright position in a shallow well 12 formed in the trunk floor 13. As is normal the tread 15 of the tire is somewhat convexly curved transversely and the side walls 14 of the tire bulge laterally beyond both the tread 15 and the ends of the rim 11. These factors should be kept in mind as the structural details of my flare holder are now detailed.

Generally speaking, my flare holder comprises a leg 16 which has a hook at one end adapted to clamp onto the tire and a pair of cross-arms 17, 18 with U-clips 19 near their ends to grip flare cartridges 20. The holder is desirably fabricated from strip stock thereby giving flat faces for engaging the tire and flat contact faces between the cross-arms and the leg. A plastic material has been illustrated for use but any material is suitable which has sufficient resiliency to permit flexure of the leg and of the hook in the manner required to clamp the holder over the tire as later described.

The cross-arms 17, 18 are secured as by counter-sunk rivets 25 and are spaced apart, in parallel relation to one another and at right angles to the leg, a distance somewhat less than the length of the flare cartridges to be used with the holder. Bolts 26 or the like are used to secure the U-clips 19 to the cross-arms, and for purposes of example, two sets of clips have been shown, each set being parallel to the leg 16. The U-clips 19 are of the type commonly used to grip fuse cartridges.

The hooked end of the holder is made up of various sections which engage a side wall or the tread of the tire and hence these will be hereinafter designated by the corresponding part of the tire which each engages. At its opposite ends the hook has two convex side-wall sections 21, 22, the first adjoining the leg 16 and the other positioned as the bill of the hook. These side-wall sections are joined by a pair of flat tread sections 23, 24 which join each other and with the side-wall sections by obtuse angles. The distance between the opposite ends of the tread sections should exceed the width of the tread of the tire on which the holder is to be clamped and a line connecting the opposite ends of the tread sections 23, 24 should form an acute angle with the longitudinal axis of the leg 16. Also, the bill tip of the hook should be spaced from the leg 16 somewhat less than the maximum width of the tire. Accordingly, the hook must be sprung further open to insert it over the tire and this assures that the side walls of the tire will be gripped between the side wall sections 21, 22 of the hook as shown in Fig. 5. It will also be noted from the latter that the holder leg 16 should be long enough to extend across radially opposite maximum bulge points of the tire so that the leg will be sprung inwardly in order for the tread sections 23, 24 of the hook to be brought down against the tire tread as the bill tip of the hook is sprung inwardly past the maximum side wall bulge of the tire. This not only assures a firmer grip for the holder and prevents any rattling thereof, but it partly recesses the cartridges 20 within the cavity of the wheel. This partial recession of the cartridges is substantially aided by the fact that the cross-arms 17, 18 are located on the hook side of the leg 16.

It is recommended that the holder be positioned on the tire vertically as shown in Fig. 4 so that the flare cartridges 20 can be arranged with their ground spikes 26 directed downwardly so that there will be the least likelihood of their snagging baggage or personnel while loading or unloading the trunk. Regardless of how the holder is applied relative to the tire, vertically, horizontally, or sloped, the flare cartridges are readily removable and such will be true even when the trunk is loaded since little or no baggage would normally have to be removed to gain access to the cartridges.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claim be given a scope fully commensurate with the broadest interpretation to which the employed language admits.

What I claim is:

In a holder for flare cartridges adapted to detachably grip a spare tire of an automobile, a leg substantially longer than the inner diameter of the tire having a pair of spaced cross-arms extending at right angles to the leg at a point intermediate the ends thereof and provided with an integral hooking bill at one of its ends and having its free end curled inwardly toward said leg and being so dimensioned that the span between the leg and said free end is appreciably less than the inflated width of the tire so that, by placing said leg such that it extends diametrically of the tire with the hooking bill gripping the tire, the other end of the leg is caused to be pressed against the side wall of the tire at a point thereon diametrically opposite from the hooking bill, thereby longitudinally bending the leg inwardly toward the center of the tire, the leg with its hooking bill being composed of a single length of material of spring characteristic permitting the hooking bill to be expanded for applying the holder to and removing the holder from the tire, and a pair of clips aligned in generally parallel relation to said leg and secured to said cross-arms on the side thereof opposite from said hooking bill, said clips being adapted to detachably grip a flare cartridge.

References Cited in the file of this patent

UNITED STATES PATENTS

| | | |
|---|---|---|
| D. 161,343 | Kabase | Dec. 26, 1950 |
| 1,222,458 | Peterson | Apr. 10, 1917 |
| 1,241,922 | Chappell | Oct. 2, 1917 |
| 1,600,630 | Green | Sept. 21, 1926 |
| 1,779,877 | Gilmore | Oct. 28, 1930 |
| 2,551,269 | Jester | May 1, 1951 |
| 2,713,469 | Wright | July 19, 1955 |

FOREIGN PATENTS

| | | |
|---|---|---|
| 863,787 | France | Jan. 6, 1941 |
| 654,890 | Great Britain | July 4, 1951 |